United States Patent
Manoraj et al.

(10) Patent No.: US 10,067,919 B2
(45) Date of Patent: Sep. 4, 2018

(54) FEEDBACK TOOL

(71) Applicant: Verizon Patent and Licensing Inc., Arlington, VA (US)

(72) Inventors: Suma Manoraj, Hillsborough, NJ (US); Raul Alvarado Ramirez, Lima (PE); Jonathan Paul Bastidas, Lima (PE)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 482 days.

(21) Appl. No.: 14/959,306

(22) Filed: Dec. 4, 2015

(65) Prior Publication Data
US 2017/0161243 A1  Jun. 8, 2017

(51) Int. Cl.
*G06F 17/22* (2006.01)
*G06F 11/07* (2006.01)
*G06F 17/24* (2006.01)
*G06F 3/0484* (2013.01)

(52) U.S. Cl.
CPC ...... *G06F 17/2288* (2013.01); *G06F 3/04842* (2013.01); *G06F 3/04845* (2013.01); *G06F 11/0706* (2013.01); *G06F 11/0751* (2013.01); *G06F 11/0772* (2013.01); *G06F 11/0775* (2013.01); *G06F 11/0784* (2013.01); *G06F 17/24* (2013.01)

(58) Field of Classification Search
CPC .................................................. G06F 17/2288
USPC ....................................................... 715/773
See application file for complete search history.

(56) References Cited

U.S. PATENT DOCUMENTS

| | | | |
|---|---|---|---|
| 2005/0049789 A1* | 3/2005 | Kelly ..................... | G08B 21/10 702/3 |
| 2006/0190770 A1* | 8/2006 | Harding .............. | G06F 11/3604 714/38.11 |
| 2006/0224545 A1* | 10/2006 | Keith, Jr. ................. | G06N 5/04 706/60 |
| 2007/0055769 A1* | 3/2007 | Kolb ................. | H04L 29/12009 709/224 |
| 2007/0074187 A1* | 3/2007 | O'Brien .................. | G06F 8/656 717/140 |
| 2007/0233633 A1* | 10/2007 | Keith, Jr. ................. | G06N 5/04 706/60 |
| 2008/0046786 A1* | 2/2008 | Patel ................... | G06F 11/0742 714/100 |

(Continued)

OTHER PUBLICATIONS

Opinionlab, http://www.opinionlab.com/services/voc-data-collection/, "Voice of Customer Data Collection", Mar. 7, 2013, 3 pages.

*Primary Examiner* — Reza Nabi

(57) ABSTRACT

A device may receive a request to generate a feedback report regarding an error. The device may cause an image associated with a user interface and the error to be captured based on receiving the request to generate the feedback report. The device may cause the image to be altered, to highlight or redact information of the image, by: altering the image to highlight a first portion of the image or altering the image to redact a second portion of the image. The device may obtain contextual information associated with the image. The device may provide the feedback report for resolution of the error. The feedback report may include the contextual information and the image that is altered to highlight or redact information of the image.

20 Claims, 5 Drawing Sheets

(56) References Cited

U.S. PATENT DOCUMENTS

| | | | | |
|---|---|---|---|---|
| 2011/0239113 | A1* | 9/2011 | Hung | G16H 15/00 |
| | | | | 715/271 |
| 2011/0252405 | A1* | 10/2011 | Meirman | G06F 11/3692 |
| | | | | 717/125 |
| 2012/0311538 | A1* | 12/2012 | Bhatia | G06F 11/3664 |
| | | | | 717/126 |
| 2013/0036413 | A1* | 2/2013 | Venkatesan | G06F 8/65 |
| | | | | 717/172 |
| 2013/0067178 | A1* | 3/2013 | Szegedi | G06F 11/0778 |
| | | | | 711/155 |
| 2013/0067285 | A1* | 3/2013 | Szegedi | G06F 21/6254 |
| | | | | 714/45 |
| 2014/0068464 | A1* | 3/2014 | Howard | G06F 3/0482 |
| | | | | 715/753 |
| 2016/0019043 | A1* | 1/2016 | Ramasamy | G06F 8/67 |
| | | | | 717/171 |
| 2016/0070812 | A1* | 3/2016 | Murphy | G06F 17/212 |
| | | | | 707/608 |
| 2016/0291970 | A1* | 10/2016 | Mallisetty | G06F 8/71 |
| 2017/0123873 | A1* | 5/2017 | Baddourah | G06F 11/079 |
| 2017/0132742 | A1* | 5/2017 | Deluca | G06T 1/0021 |
| 2017/0200021 | A1* | 7/2017 | Patel | G06F 21/6245 |

* cited by examiner

FEEDBACK TOOL

BACKGROUND

A user may identify an error during utilization of a website, a software application, or the like. The user may provide, via a user interface of a user device, feedback identifying the error, rating a user experience, or the like. For example, the user may provide a textual description of the error. A developer may receive, via another user interface of a developer device, the textual description of the error and may attempt to fix the error based on the textual description.

DETAILED DESCRIPTION OF PREFERRED EMBODIMENTS

The following detailed description of example implementations refers to the accompanying drawings. The same reference numbers in different drawings may identify the same or similar elements.

A user may identify an error, such as in a website, an application, or the like. The user may provide, via a user interface of a user device, a textual description of the error. The textual description of the error may be provided to a developer device for utilization by a recipient (e.g., a developer) tasked with fixing the error. The recipient may attempt to fix the error based on receiving the textual description of the error. However, the textual description of the error may lack contextual information that a developer may desire to assess and fix the error. Moreover, the textual description provided to the developer may include personal information that is not intended for dissemination to particular developers (e.g., offshore developers, relatively low level developers, or the like). Implementations, described herein, may utilize a feedback tool with an integrated image capture functionality to generate a feedback report for a developer. Moreover, the feedback tool may facilitate alteration of an image to highlight relevant portions of the image, redact personal information from the image, or the like. In this way, a feedback device operating the feedback tool provides improved feedback management relative to a textual feedback technique, thereby facilitating a reduction in errors experienced by users.

Figure 1A:
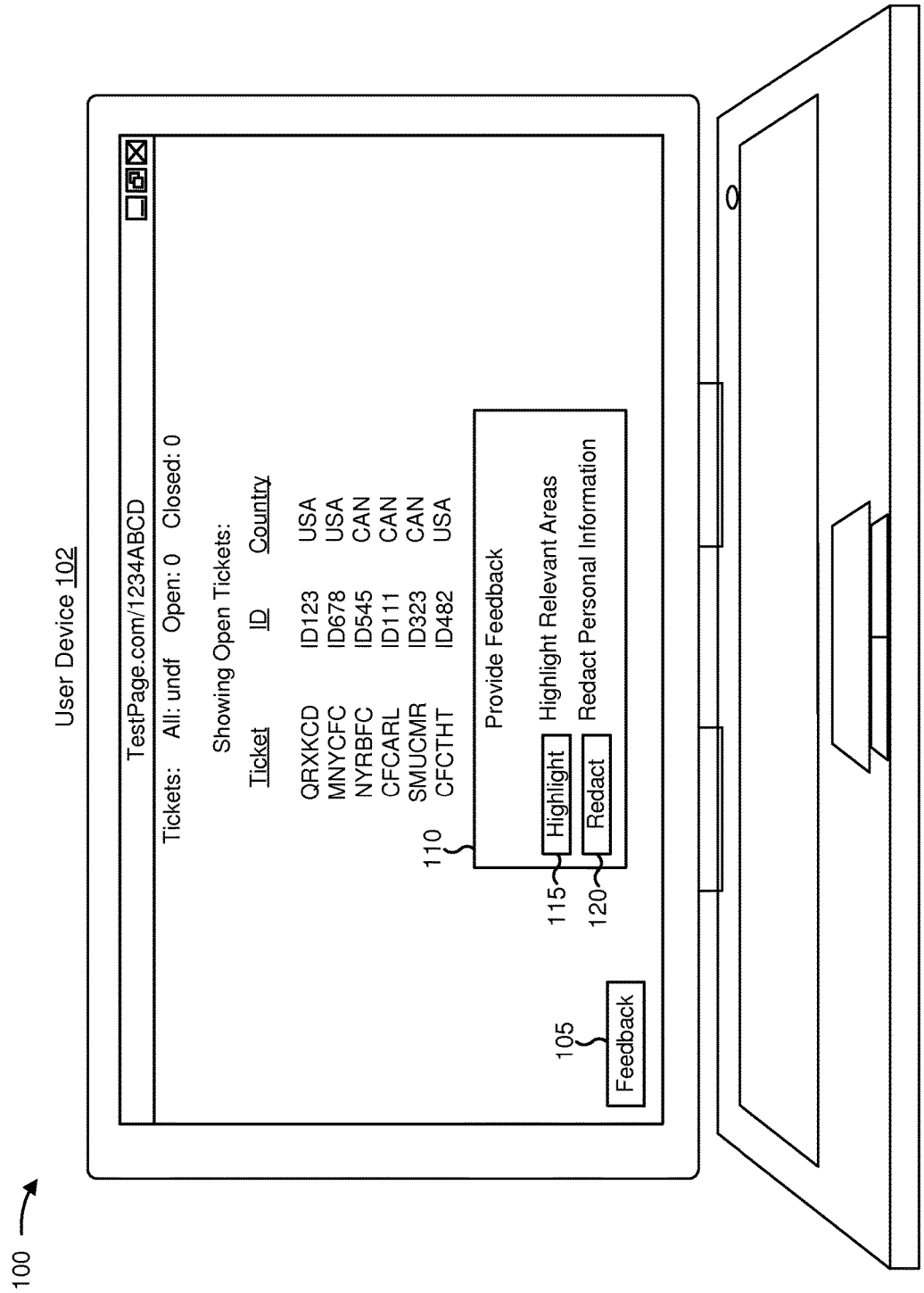
FIGS. 1A and 1B are diagrams of an overview of an example implementation described herein.
Figure 1B:
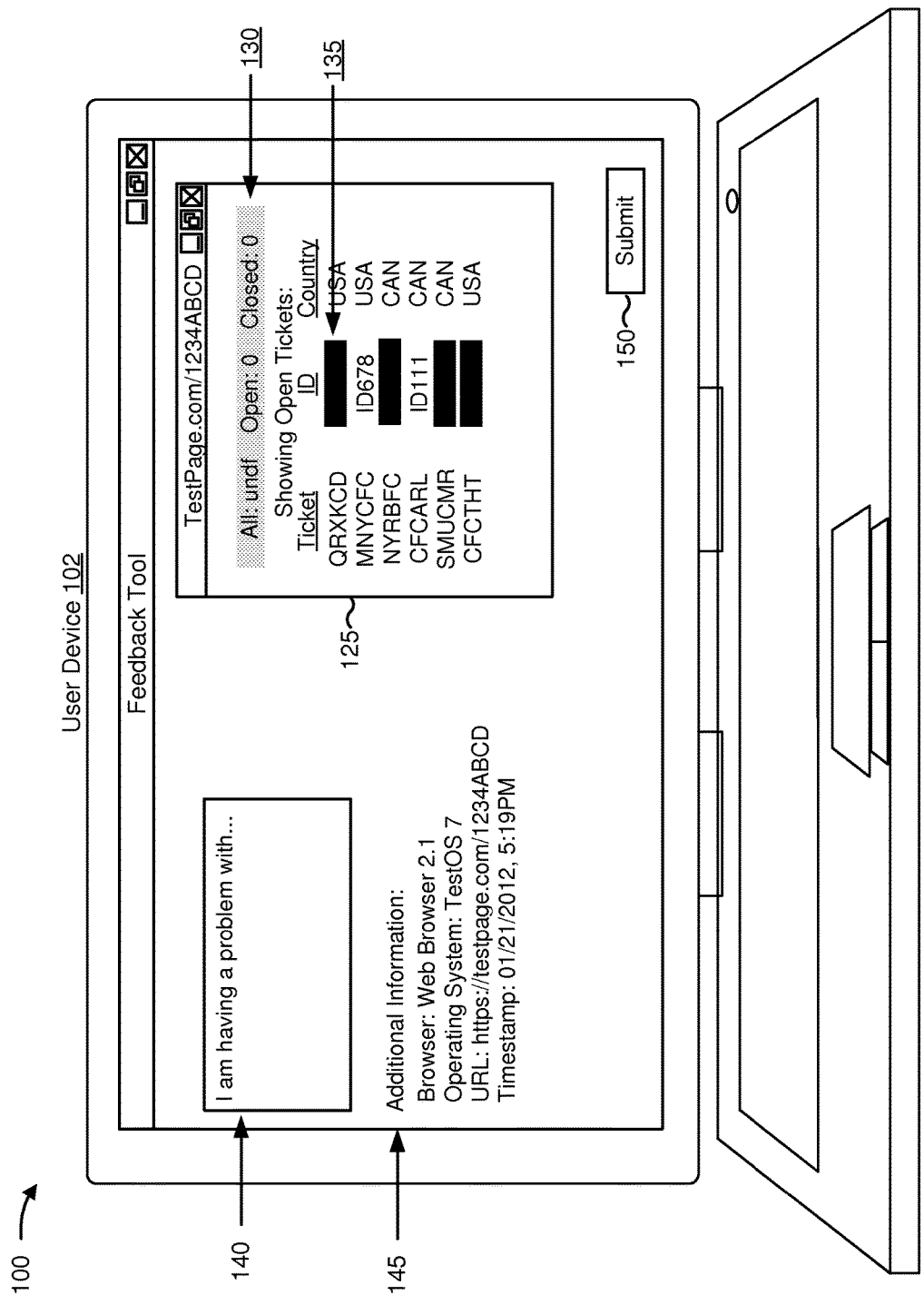

FIGS. 1A and 1B are diagrams of an overview of an example implementation 100 described herein. FIGS. 1A and 1B provide an example of managing a feedback report.

As shown in FIG. 1A, a user may utilize a browser of user device 102 to navigate to a page of a website (e.g., "TestPage.com/1234ABCD"). Assume that a feedback device (not shown) associated with collecting feedback regarding the website causes a feedback tool to operate in the browser of user device 102. As shown by reference number 105, the feedback tool provides a button for triggering generation of a feedback report. A feedback report may refer to information associated with providing feedback regarding an error, such as an image, a textual description, contextual information, or the like. Assume that the user identifies an error regarding a quantity of tickets that are being displayed in the browser (e.g., "All: undf, Open: 0, Closed: 0" when the quantity of tickets is intended to display as "All: 32, Open: 12, Closed: 20") and subsequently clicks on the button.

As further shown in FIG. 1A, and by reference number 110, another user interface element (e.g., a pop-up window) is provided to facilitate selecting information for the feedback report. For example, the user may cause the feedback tool to capture an image of a portion of the website (e.g., a screenshot) in which the error is located. As shown by reference number 115 and 120, other user interface elements are provided to facilitate highlighting a portion of the image (e.g., a portion determined to be related to the error), redacting a portion of the image (e.g., a portion determined to include personal information), or the like. Assume that the user causes the feedback tool to highlight a first portion of the image and redact a second portion of the image.

As shown in FIG. 1B, the feedback tool may cause user device 102 to provide a preview of the image with the first portion highlighted, as shown by reference number 130, and the second portion redacted, as shown by reference number 135. As shown by reference 140, a user interface element (e.g., a text box) is provided with which to provide a textual description associated with the image and/or the error. As shown by reference number 145, the feedback tool may cause user device 102 to determine contextual information associated with the image and/or the error, such as information identifying a browser being utilized by the user, an operating system being utilized by the user, a universal resource locator (URL) associated with the website for which the error occurs, a timestamp associated with the image, or the like. As shown by reference number 150, based on a user interaction with a submission button, the feedback tool may generate the feedback report, which includes the image with the first portion highlighted and the second portion redacted, the textual description, the contextual information, or the like, and may cause the feedback report to be provided to the feedback device.

Based on receiving the feedback report from user device 102, the feedback device may selectively alter the feedback report (e.g., highlight information, redact information, classify information based on a level of privacy, or the like). For example, the feedback device may perform an analysis technique, such as a text recognition technique, a pattern recognition technique, a machine learning technique, a natural language processing technique, or the like, to analyze the feedback report and remove information from the feedback report, such as a user name, a password, a credit card number, a social security number, or the like. In this way, the feedback device may automatically ensure that personal information is not revealed to a user assigned to fix an error identified by the feedback report.

The feedback device may provide the feedback report to one or more developer devices for review by a recipient, or the like. For example, the feedback device may receive information identifying the error, determine the error based on the feedback report, or the like. The feedback device may determine an attribute associated with the error, such as a type of error (e.g., a backend error, a frontend error, a customer service error, or the like). The feedback device may determine another attribute associated with the error, such as a type of user (e.g., a type of recipient) to whom the error may be assigned, such as a developer, a customer service representative or the like. Additionally, or alternatively, the feedback device may determine a program code knowledge requirement for the user, an organizational level associated with the user (e.g., a customer service representative, a customer service supervisor, etc.), a geographic location associated with the user (e.g., a customer service representative responsible for a particular city, state, country, etc.), or the like associated with the error.

Based on the attribute of the error, the feedback device may identify a recipient associated with a corresponding attribute, and may assign the error to recipient (e.g., a developer, a customer service representative, etc.). The feedback device may cause the feedback report to be added to a queue associated with the particular user. For example, the feedback device may automatically add the feedback report to a workflow and provide a notification that the feedback report has been added to the workflow.

The feedback device may receive an indication that the user (e.g., the developer) has fixed the error. The feedback device may provide follow up information to user device 102, for display via a user interface, indicating that the error has been fixed and/or identifying a solution that is implemented to fix the error. For example, the feedback device may generate the follow up information based on the type of error, a report identifying a fix of the error, or the like, and may provide the follow up information for display to a user of user device 102.

In this way, the feedback device manages a feedback report that includes an image associated with an error. This permits the feedback device to reduce a quantity of errors associated with the website, relative to another feedback technique, based on providing information that facilitates faster remediation of errors.

Figure 2:
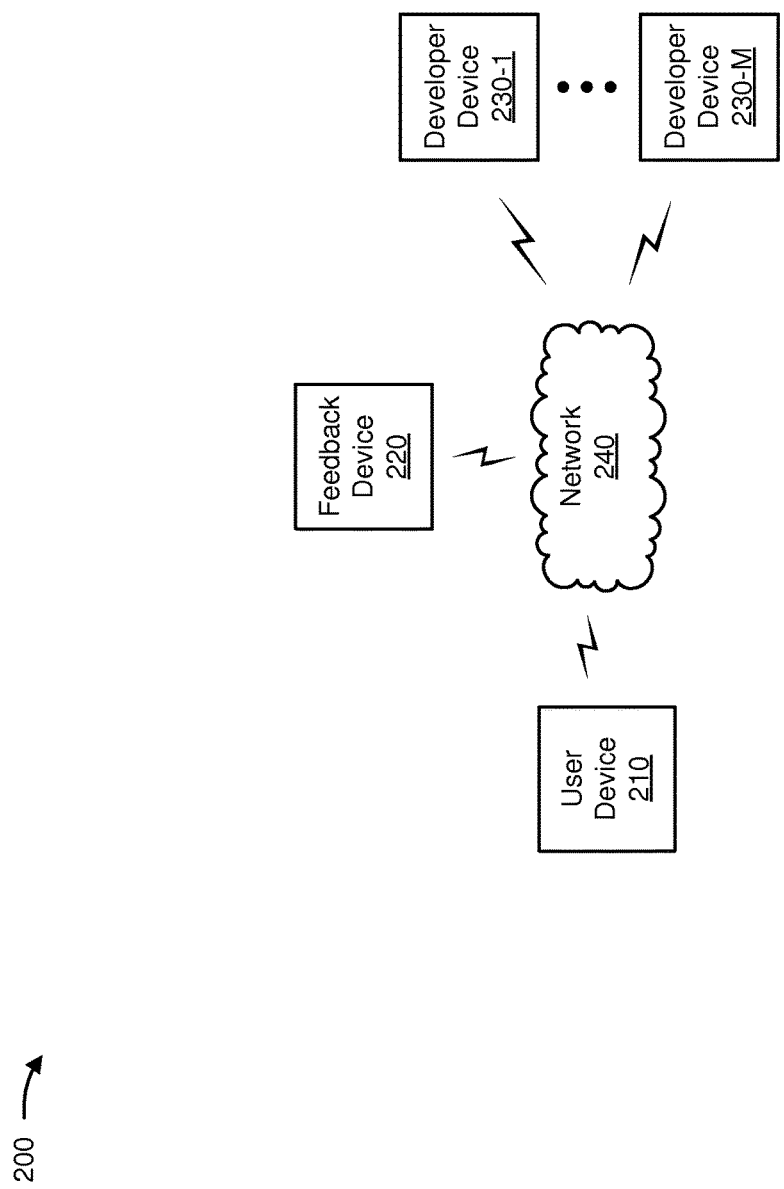
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a feedback device 220, one or more developer devices 230-1 through 230-M, (M≥1) (hereinafter referred to collectively as "developer devices 230," and individually as "developer device 230"), and a network 240. Devices of environment 200 may interconnect via wired connections, wireless connections, or a combination of wired and wireless connections.

User device 210 may include one or more devices capable of receiving, generating, storing, processing, and/or providing information associated with an error. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, a feedback tool may be operated in association with user device 210. In some implementations, user device 210 corresponds to user device 102 shown in FIGS. 1A and 1B. In some implementations, user device 210 may receive information from and/or transmit information to another device in environment 200.

Feedback device 220 may include one or more devices capable of storing, processing, and/or routing information. For example, feedback device 220 may include a server that provides a feedback tool, receives a feedback report generated by the feedback tool, and selectively routes the feedback report. In some implementations, feedback device 220 may include a computer (e.g., a desktop computer, a laptop computer, a tablet computer, or the like) that facilitates altering a feedback report, classifying information included in a feedback report, or the like. In some implementations, feedback device 220 may utilize one or more processing techniques to generate a feedback report and/or analyze a feedback report, such as a natural language processing technique, a text recognition technique, a pattern recognition technique, a machine learning technique, or the like. In some implementations, feedback device 220 may cause a feedback tool to be operated in association with user device 210. In some implementations, feedback device 220 corresponds to the feedback device described with regard to FIGS. 1A and 1B. In some implementations, feedback device 220 may include a communication interface that allows feedback device 220 to receive information from and/or transmit information to other devices in environment 200.

Developer device 230 may include one or more devices capable of receiving, generating, storing, processing, and/or providing information associated with facilitating access to a feedback report and correction of an error identified by the feedback report. For example, developer device 230 may include a computer (e.g., a desktop computer, a laptop computer, a tablet computer, or the like) that receives a feedback report and provides the feedback report for display to a developer. In some implementations, developer device 230 corresponds to the developer device described herein with regard to FIGS. 1A and 1B. In some implementations, developer device 230 may receive information from and/or transmit information to another device in environment 200.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although user device 210 and feedback device 220 are shown as two separate devices, user device 210 and feedback device 220 may be implemented within a single device. Additionally, or alternatively, a set of devices (e.g., one or more devices) of environment 200 may perform one or more functions described as being performed by another set of devices of environment 200.

Figure 3:
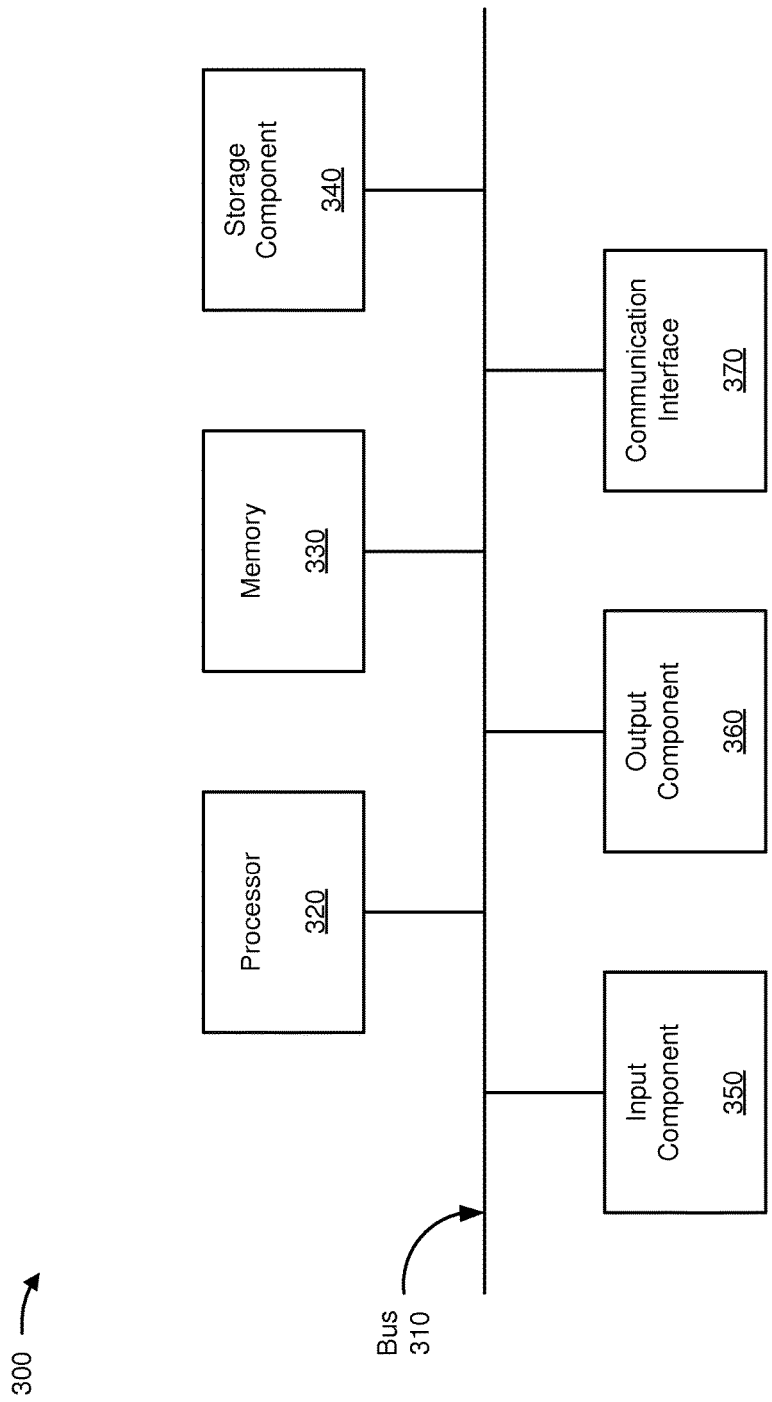
FIG. 3 is a diagram of example components of one or more devices of FIG. 2.

FIG. 3 is a diagram of example components of a device 300. Device 300 may correspond to user device 210, feedback device 220, and/or developer device 230. In some implementations, user device 210, feedback device 220, and/or developer device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Process 320 may include one or more processors that can be programmed to perform a function. Processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
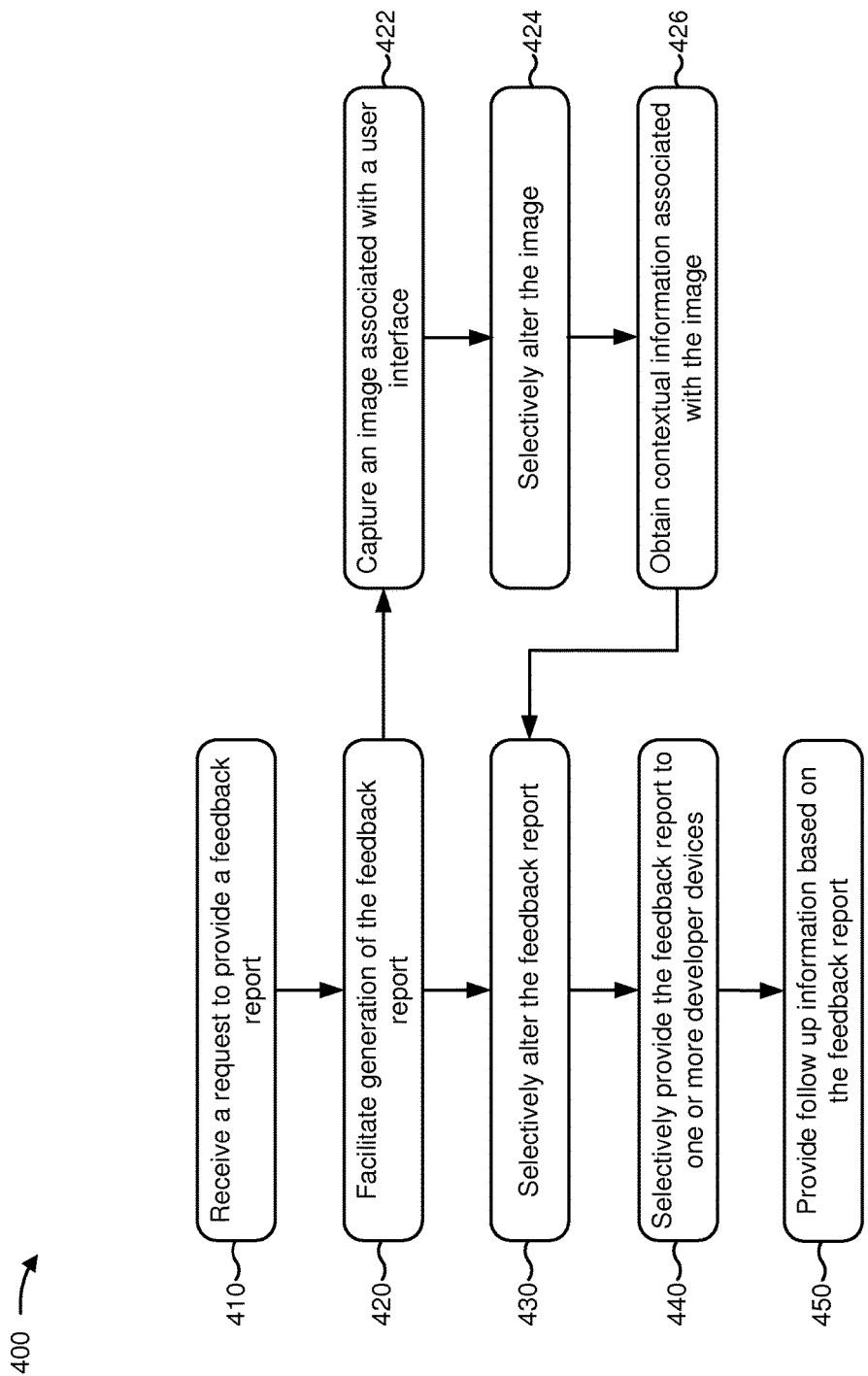
FIG. 4 is a flow chart of an example process for managing a feedback report.

FIG. 4 is a flow chart of an example process 400 for managing a feedback report. In some implementations, one or more process blocks of FIG. 4 may be performed by feedback device 220. In some implementations, one or more process blocks of FIG. 4 may be performed by another device or a group of devices separate from or including feedback device 220, such as user device 210 and/or developer device 230.

As shown in FIG. 4, process 400 may include receiving a request to provide a feedback report (block 410). For example, feedback device 220 may receive the request to provide the feedback report. The feedback report may refer to information generated to facilitate remediation of an error associated with a website, an application, or the like. For example, the feedback report may include an image of the error, a description of the error, contextual information regarding a state of user device 210 when the error is observed (e.g., browser identification information, operating system (OS) identification information, etc.), or the like. In this way, the feedback report includes information that increases a likelihood of fixing an error and/or reduces a quantity of time required to fix the error relative to text-only feedback.

In some implementations, feedback device 220 may receive the request from user device 210. For example, user device 210 may transmit, to feedback device 220, a request to generate the feedback report. In this case, feedback device 220 may provide a feedback tool to user device 210 to facilitate generation of the feedback report. Additionally, or alternatively, feedback device 220 may receive the request based on operating the feedback tool for user device 210. For example, feedback device 220 may cause the feedback tool to operate in association with a browser of user device 210 (e.g., as a plug-in, as an application, as an applet, as a toolbar, as a toolbar button, etc.), and may receive the request based on detecting a user interaction with a button of the feedback tool. In this case, feedback device 220 may cause the feedback tool to facilitate generation of the feedback report.

As further shown in FIG. 4, process 400 may include facilitating generation of the feedback report (block 420). For example, feedback device 220 may facilitate generation of the feedback report. In some implementations, feedback device 220 may provide a feedback tool to user device 210 to generate the feedback report. For example, feedback device 220 may provide the feedback tool for operation on user device 210, and the feedback tool may cause user device 210 to display one or more user interface elements associated with generating the feedback report. Additionally, or alternatively, feedback device 220 may operate the feedback tool to facilitate generation of the feedback report. For example, feedback device 220 may cause the feedback tool to generate the feedback report, as described herein with regard to blocks 422, 424, and 426.

As further shown in FIG. 4, process 400 may include capturing an image associated with a user interface (block 422). For example, feedback device 220 may cause the feedback tool to capture the image associated with the user interface. The user interface may include a presentation of information to a user in which an error is observed. For example, feedback device 220 may cause the feedback tool to capture a screenshot of a browser window being presented on user device 210 when an error is observed with regard to information provided via the browser window. Additionally, or alternatively, feedback device 220 may cause the feedback tool to capture a screenshot of an application or another user interface being provided via user device 210. In some implementations, feedback device 220 may receive a captured image associated with a user interface. For example, based on user device 210 utilizing a screenshot capture utility to capture an image and saving the image to a data structure, feedback device 220 may obtain the image from the data structure for inclusion in the feedback report. In this way, feedback device 220 includes, in the feedback report, an image of an error, thereby providing information that aids a developer in resolving the error in a reduced quantity of time relative to other feedback techniques.

As further shown in FIG. 4, process 400 may include selectively altering the image (block 424). For example, feedback device 220 may selectively alter the image. In some implementations, feedback device 220 may provide one or more user interface elements associated with altering the image. For example, feedback device 220 may cause the feedback tool to provide, via user device 210, one or more user interface elements, an interaction with which causes an alteration to the image. In this way, feedback device 220 facilitates selective modification of the image by a user.

In some implementations, feedback device 220 may alter the image by causing information to be redacted from the image. Redacting information may refer to altering the image to obscure particular information included in the image. For example, feedback device 220 may cause the feedback tool to receive an indication, from a user via an interaction with user device 210, to reduce a visibility of a portion of the image, remove a portion of the image, or the like. In this way, feedback device 220 facilitates directing attention of a potential developer away from information deemed irrelevant to the error. Moreover, feedback device 220 facilitates redaction of information deemed personal to the user.

In some implementations, feedback device 220 may alter the image by causing information to be highlighted in the image. Highlighting information may refer to altering the image to indicate that particular information included in the image is of a greater importance than other information. For example, feedback device 220 may cause the feedback tool to receive an indication, from a user via an interaction with user device 210, to alter a color of a portion of the image, include a box surrounding a portion of the image, reduce a visibility of a first portion of an image to highlight a second portion of the image, or the like. In this way, feedback device 220 facilitates directing attention of a potential developer toward information in the image that is particularly relevant to an error, such as erroneous information caused by the error or the like.

In some implementations, feedback device 220 may analyze the image, and may alter the image based on analyzing the image. For example, feedback device 220 may determine that one or more portions of the image including personal information (e.g., a text box, a data entry, or the like that includes a user name, a password, a social security number, an address, a credit card number, or the like). In some implementations, feedback device 220 may utilize a particular processing technique to determine that the one or more portions of the image include personal information. For example, feedback device 220 may utilize a text recognition technique to determine that a particular portion of text corresponds to a social security number. Similarly, feedback device 220 may utilize a pattern recognition technique to determine that a particular portion of an image includes a text box for receiving a password. In this case, feedback device 220 may redact the personal information based on identifying the personal information.

Additionally, or alternatively, feedback device 220 may analyze and alter another type of data, such as a web page, a document, or the like. In this way, feedback device 220 ensures that a user to whom the feedback report is provided is not provided personal information regarding a user regarding whom the feedback report is generated. Additionally, or alternatively, feedback device 220 may utilize one or more of the processing techniques to identify information that is to be highlighted, such as information that differs from expected information by a threshold difference. In this way, feedback device 220 automatically identifies information to which to call the attention of a user assigned to fix an error associated with the information.

As further shown in FIG. 4, process 400 may include obtaining contextual information associated with the image (block 426). For example, feedback device 220 may obtain the contextual information associated with the image. The contextual information may include information identifying an operating system being utilized when the image is captured, a web browser being utilized when the image is captured, a URL being accessed when the image is captured, a timestamp associated with the image, a quantity of processor and/or memory resources associated with user device 210, or the like. For example, feedback device 220 may cause user device 210 to provide the contextual information regarding the error and/or the image. In this way, feedback device 220 obtains information that may be utilized to recreate conditions of the error by a developer using developer device 230. In some implementations, feedback device 220 may obtain a description of the error when obtaining the contextual information. For example, feedback device 220 may cause user device 210 to provide a text box with which to receive a description from a user of the error, and may include the description in the feedback report. In this way, feedback device 220 obtains information that may be utilized to identify the error shown in the image.

As further shown in FIG. 4, process 400 may include selectively altering the feedback report (block 430). For example, feedback device 220 may selectively alter the feedback report based on a characteristic associated with a developer to which the feedback report is to be provided, such as a characteristic of the developer (e.g., a seniority of the developer, a geographic location of the developer, a workload of the developer, a qualification of the developer, etc.), a characteristic of a particular developer device 230 utilized by the developer (e.g., a security protocol of the particular developer device 230, a location of the particular developer device 230, etc.), or the like. In some implementations, feedback device 220 may provide a user interface with which to facilitate alteration of the feedback report. For example, feedback device 220 may provide a user interface with which an administrator can view the feedback report and selectively alter the feedback report. In this way, feedback device 220 permits an administrator to identify personal information in the feedback report that is not to be provided to a particular developer.

In some implementations, feedback device 220 may alter the feedback report to remove personal information associated with one or more users. For example, feedback device 220 may determine that information included in the feedback report, such as information shown in the image, is customer proprietary network information (CPNI) that is not to be provided to developers, and may remove the information from the feedback report, such as by redacting the information (e.g., information included in the image, as described with regard to block 424, information included in the contextual information, or the like). In this way, feedback device 220 may ensure that personal information is protected despite a user of user device 210 failing to redact the personal information.

In some implementations, feedback device 220 may classify information associated with the feedback report, and may generate altered versions of the feedback report based on classifying the information. For example, feedback device 220 may classify a portion of the image as pertaining to personal information. In this case, feedback device 220 may alter the feedback report to generate a first version where the personal information is obscured and a second version where the personal information is not obscured. In this way, feedback device 220 may generate different versions of the feedback report for different developers based on geographic location to which a particular version of the feedback report is intended to be provided, an employee level of an employee that is to receive the particular version of the feedback report (e.g., junior level employee, senior level employee, etc.), or the like (e.g., off-shore or junior-level developers being provided the first version, on-shore or senior-level developers being provided the second version, or the like).

As further shown in FIG. 4, process 400 may include selectively providing the feedback report to one or more developer devices (block 440). For example, feedback device 220 may selectively provide the feedback report to developer device 230. In some implementations, feedback device 220 may select a particular developer device 230 to which to provide the feedback report. For example, feedback device 220 may select the particular developer device 230, of a set of developer devices 230, based on a geographic location of the particular developer device 230. Additionally or alternatively, feedback device 220 may select the particular developer device 230 based on a security protocol associated with the particular developer device 230, a seniority level of a developer (or customer service representative, manager, or the like) using the particular developer device 230, a qualification of the developer using the particular developer device 230, or the like.

In some implementations, feedback device 220 may provide a version of the feedback report to a customer service representative or another type of user (e.g., a manager or the like). For example, feedback device 220 may analyze the feedback report to determine a type of error associated with the report, and may provide the feedback report to a particular user associated with the type of error. In this case, feedback device 220 may provide a feedback report relating to a customer service issue to a customer service representative, a feedback report relating to a backend issue to a backend developer, a feedback report related to organizational governance to a manager, or the like.

In some implementations, feedback device 220 may provide a version of the feedback report based on a characteristic associated with developer device 230. For example, feedback device 220 may provide a first version of the feedback report to a first developer device 230 located in a first geographic location and a second version of the feedback report to a second developer device 230 located in a second geographic location. In this way, feedback device 220 ensures that information to which a particular developer is not intended to have access is not inadvertently disclosed in the feedback report.

In some implementations, the first version and the second version may differ based on a set of classification levels associated with personal information. For example, feedback device 220 may determine that personal information classified at a first level (e.g., high security information) may be provided to developer devices 230 in the first geographic location (e.g., on-shore developer devices 230), personal information classified at a second level (e.g., medium security information) may be provided to developer devices 230 in the first geographic location and particular developer devices 230 in a second geographic location (e.g., off-shore developer devices 230 utilized by senior-level developers), and personal information classified at a third level (e.g., low security information) may be provided to developer devices 230 in the first geographic location and any developer device 230 in the second geographic location. In this way, feedback device 220 ensures data security for customers by restricting dissemination of personal information based on geographic location, based on security protocol, based on employee seniority, or the like.

In some implementations, feedback device 220 may provide the feedback report to a particular developer device 230 associated with a particular developer based on a characteristic of a developer to whom the feedback report is provided. For example, feedback device 220 may select a developer, from a set of developers, based on a qualification level of the developer, a type of error, a workload of the developer, a field of expertise of the developer, an employment status of the developer (e.g., an employee, a contractor, etc.), or the like. In this case, feedback device 220 may provide the feedback report to the particular developer device 230 being utilized by the selected developer.

As further shown in FIG. 4, process 400 may include providing follow up information based on the feedback report (block 450). For example, feedback device 220 may provide follow up information based on the feedback report to user device 210. In some implementations, feedback device 220 may provide multiple instances of follow up information based on the feedback report. For example, feedback device 220 may provide, to user device 210, confirmation information (e.g., indicating that a feedback report is received), assignment information (e.g., indicating that the feedback report is assigned to a developer for investigation), and/or resolution information (e.g., indicating a resolution associated with the feedback report, such as a fix of an error, a failure to identify the error, or the like). In this way, feedback device 220 ensures that a user who causes a feedback report to be generated remains informed regarding a status of the feedback report and a resolution of an error identified in the feedback report.

In some implementations, feedback device 220 may automatically generate the follow up information. For example, feedback device 220 may automatically generate the follow up information based on a type of error that was included in the feedback report, a type of fix that was performed on the error by developer device 230, an extent to which the error is resolved, or the like. In some implementations, feedback device 220 may automatically generate the follow up information based on a text generation technique, such as an automatic text generation technique associated with generating natural language text to describe a situation (e.g., the error and a resolution thereto).

In some implementations, feedback device 220 may establish a communication channel between user device 210 and developer device 230 for follow up information. For example, feedback device 220 may facilitate an exchange of messages between a user and a developer to facilitate gathering additional information for the developer, communicating a resolution to an error, or the like. In this way, feedback device 220 may reduce a likelihood that an error fails to be resolved as a result of insufficient feedback information relative to a lack of communication between the user and the developer.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, feedback device 220 obtains information, regarding an error in a browser, application, or the like, that includes an image and provides the information to a developer for resolution of the error, thereby improving user experience and reducing errors relative to other feedback techniques.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a request to generate a feedback report regarding an error,
the request being associated with an image that is associated with a user interface and the error;
select a recipient for the feedback report,
the recipient being associated with a particular geographic location; redact personal information from the feedback report based on the recipient being associated with working from the particular geographic location,
the personal information being identified by a particular processing technique,
the particular processing technique including at least one of:
a text recognition technique,
a pattern recognition technique,
an image recognition technique,
a natural language processing technique, or
a machine learning technique,
the feedback report including an altered version of the image,
the altered version of the image including:
a first portion that is highlighted, and
a second portion that is redacted,
the second portion including the personal information; provide, after redacting the personal information from the feedback report, the feedback report to the recipient for resolution of the error; and provide follow-up information associated with the resolution of the error.

2. The device of claim 1,
where the request is received from a particular user;
where the one or more processors are further to:
automatically generate the follow-up information,
the follow-up information identifying the resolution of the error; and
where the follow-up information is provided for display to the particular user.

3. The device of claim 1,
where the recipient is a developer; and
where the one or more processors, when providing the feedback report for resolution, are to:
provide a version of the feedback report for utilization by the developer,
the version of the feedback report being generated based on a characteristic associated with the developer.

4. The device of claim 1, where the one or more processors are further to:
obtain, as the image, a screenshot of the user interface, the screenshot being associated with depicting the error.

5. The device of claim 1, where the feedback report further includes information identifying a web browser being utilized when the image is captured.

6. The device of claim 1, where the one or more processors, when selecting the recipient for the feedback report, are to:
select the recipient for the feedback report based on a security protocol associated with a developer device of the recipient or a seniority level of the recipient.

7. A non-transitory computer-readable medium storing instructions, the instructions comprising:
one or more instructions that, when executed by one or more processors, cause the one or more processors to:
receive a request to generate a feedback report regarding an error,
the request being associated with an image that is associated with the error;
select a particular recipient, for the feedback report, based on an attribute of the particular recipient,
the particular recipient being associated with a particular geographic location;
redact personal information from the feedback report based on the particular recipient being associated with the particular geographic location,
the personal information being identified by a particular processing technique,
the particular processing technique including at least one of:
a text recognition technique,
a pattern recognition technique,
an image recognition technique,
a natural language processing technique, or
a machine learning technique,
the feedback report including an altered version of the image,
the altered version of the image including:
a first portion that is highlighted, and
a second portion that is redacted,
the second portion including the personal information; provide, after redacting the personal information from the feedback report, the feedback report to the particular recipient for resolution of the error,
the feedback report including the altered image and contextual information associated with the error; and
provide follow-up information associated with the resolution of the error.

8. The non-transitory computer-readable medium of claim 7, where the follow-up information includes at least one of:
confirmation information indicating that the feedback report is received,
assignment information indicating that the feedback report is assigned to a developer,
resolution information indicating that the error is resolved, or
resolution information indicating that the error is not resolved.

9. The non-transitory computer-readable medium of claim 7,
where the one or more instructions, when executed by the one or more processors, further cause the one or more processors to:
identify the personal information in the image; and
where the one or more instructions, that cause the one or more processors to redact the personal information, cause the one or more processors to:
alter, to obtain the altered version of the image, the image to remove the personal information.

10. The non-transitory computer-readable medium of claim 9,
where the particular geographic location is a first geographic location,
where the recipient is a developer who is assigned to the feedback report and is associated with working from the first geographic location, and
where the first geographic location is different from a second geographic location with which a user, who identified the error, is associated.

11. The non-transitory computer-readable medium of claim 7,
where the one or more instructions, when executed by the one or more processors, further cause the one or more processors to:
identify a type of the error; and
determine that the attribute of the particular recipient corresponds to the type of the error; and
where the one or more instructions, that cause the one or more processors to select the particular recipient, cause the one or more processors to:
select the particular recipient based on determining that the attribute of the particular recipient corresponds to the type of the error.

12. The non-transitory computer-readable medium of claim 7, where the one or more instructions, when executed by the one or more processors, further cause the one or more processors to:
provide one or more user interface elements associated with altering the image;
detect a user interaction with a user interface element of the one or more user interface elements; and
alter the image based on detecting the user interaction.

13. The non-transitory computer-readable medium of claim 7, where the one or more instructions, when executed by the one or more processors, further cause the one or more processors to:
receive, from the particular recipient, information identifying the resolution to the error; and
generate the follow-up information based on receiving the information identifying the resolution to the error.

14. The non-transitory computer-readable medium of claim 7, where the feedback report further includes information identifying a universal resource locator (URL) being accessed when the image is captured.

15. A method, comprising:
receiving, by a device, a request to generate a feedback report regarding an error, the request being associated with an image that is associated with the error;
selecting, by the device, a particular recipient for the feedback report,
the feedback report being associated with a particular geographic location; redacting, by the device, personal information from the feedback report based on determining that the particular recipient is associated with the particular geographic location,
the personal information being identified by a particular processing technique,
the particular processing technique including at least one of:
a text recognition technique,
a pattern recognition technique,
an image recognition technique,
a natural language processing technique, or
a machine learning technique,
the feedback report including an altered version of the image,
the altered version of the image including:
a first portion that is highlighted, and
a second portion that is redacted,
the second portion including the personal information; providing, by the device and after redacting the personal information from the feedback report, the feedback report to the particular recipient for resolution of the error; and
providing, by the device, follow-up information associated with the resolution of the error.

16. The method of claim 15, where the follow-up information identifies the resolution of the error.

17. The method of claim 15, where the particular recipient is a developer who is assigned to the feedback report and is associated with working from the particular geographic location.

18. The method of claim 17, where selecting the particular recipient comprises:
selecting the developer for the resolution of the error based on an attribute of the error and a corresponding attribute of the developer.

19. The method of claim 15, where redacting the personal information from the feedback report comprises:
automatically identifying the second portion of the image for redaction; and
redacting the second portion of the image based on automatically identifying the second portion of the image.

20. The method of claim 15, where the feedback report further includes information identifying an operating system being utilized when the image is captured.

* * * * *